(12) United States Patent
Iwase (10) Patent No.: US 7,162,276 B2
(45) Date of Patent: Jan. 9, 2007

(54) MOBILE COMMUNICATION TERMINAL HAVING HANDS-FREE SPEECH STATE AND COMPUTER PROGRAM FOR SWITCHING OVER TO HANDS-FREE SPEECH STATE

(75) Inventor: Mitsuaki Iwase, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 10/408,445

(22) Filed: Apr. 8, 2003

(65) Prior Publication Data

US 2003/0203746 A1    Oct. 30, 2003

(30) Foreign Application Priority Data

Apr. 23, 2002  (JP)  ............... 2002-121357

(51) Int. Cl.
   *H04B 1/38*  (2006.01)
(52) U.S. Cl. ................... 455/569.1; 455/569.2
(58) Field of Classification Search ............ 455/556.1, 455/556.2, 569.1, 569.2
   See application file for complete search history.

(56) References Cited

U.S. PATENT DOCUMENTS

| | | | | |
|---|---|---|---|---|
| 4,653,086 A | * | 3/1987 | Laube .................. | 379/93.19 |
| 4,856,050 A | * | 8/1989 | Theis et al. ............ | 379/68 |
| 5,588,041 A | * | 12/1996 | Meyer et al. ........... | 455/569.2 |
| 5,818,924 A | | 10/1998 | King et al. | |
| 6,014,573 A | * | 1/2000 | Lehtonen et al. ........ | 455/569.1 |
| 6,850,226 B1 | * | 2/2005 | Finke-Anlauff .......... | 345/169 |

FOREIGN PATENT DOCUMENTS

| | | |
|---|---|---|
| CN | 1291852 A | 4/2001 |
| EP | 0 564 160 A2 | 3/1993 |
| EP | 0 776 115 A2 | 5/1997 |
| EP | 1 071 263 A1 | 1/2001 |
| GB | 2 378 861 A | 7/2002 |

(Continued)

OTHER PUBLICATIONS

Japanese Office Action dated Sep. 21, 2004, with partial English translation.

(Continued)

*Primary Examiner*—Bing Q. Bui
(74) *Attorney, Agent, or Firm*—McGinn IP Law Group, PLLC (57) ABSTRACT

A mobile communication terminal having a hands-free speech state, in which a speech function and one of the other functions, such as a browsing information function on the Internet and an e-mail transmitting or receiving function, can be operated simultaneously, by not interrupting the speech function and by not using an earphone-microphone, is provided. The mobile communication terminal having the hands-free speech state provides a controlling section that controls each section in the mobile communication terminal having the hands-free speech state, a memory that stores data and a computer program, an operating section that a user executes a key input, a displaying section on which information is displayed, a speaker that outputs sound, and a microphone to which the user inputs his/her voice. And in case that the one of the functions except the speech function is used during the speech state, the speech state is automatically switched over to the hands-free speech state, by the operation of the controlling section, and the one of the functions is executed with the speech function simultaneously.

24 Claims, 3 Drawing Sheets

FOREIGN PATENT DOCUMENTS

| | | |
|---|---|---|
| JP | 05-103070 | 4/1993 |
| JP | 09-181801 | 7/1997 |
| JP | 9-187060 | 7/1997 |
| JP | 2001-197556 | 7/2001 |
| JP | 2001-339497 | 12/2001 |
| JP | 2002-33797 | 1/2002 |

OTHER PUBLICATIONS

English Translation of the Chinese Office Action dated May 14, 2004.

* cited by examiner

F I G. 1

F I G. 3

MOBILE COMMUNICATION TERMINAL HAVING HANDS-FREE SPEECH STATE AND COMPUTER PROGRAM FOR SWITCHING OVER TO HANDS-FREE SPEECH STATE

BACKGROUND OF THE INVENTION

The present invention relates to a mobile communication terminal having a hands-free speech state and a computer program for switching over to the hands-free speech state, at a mobile communication terminal that can simultaneously operate a speech function and one of the other functions, such as a browsing information function on the Internet, an e-mail transmitting or receiving function, and an executing one of the other application functions by a multi-task. In particular, in case that a function in addition to the speech function is used during its speech state, the mobile communication terminal having the hands-free speech state switches over the speech state to the hands-free speech state automatically.

DESCRIPTION OF THE RELATED ART

Recently, the development and the progress of functions of a mobile communication terminal have been remarkable. That is, the mobile communication terminal has been able to access to networks such as the Internet, to transmit or receive an e-mail, and to start up various applications, besides to make a phone call. In such a mobile communication terminal having multi-functions, there are many cases that the user of the mobile communication terminal desires to execute another function during its phone call. For example, when the user is having a conversation with a person, in case that the user wants to confirm a topic on the conversation, the user desires to browse the topic on the Internet.

However, at the time when the user browses information on the Internet or makes an e-mail, the user must operate the mobile communication terminal in a state that the user is confirming the screen on the mobile communication terminal. That is, the user must move the mobile communication terminal from the ear of the user. Therefore, it is difficult to operate the speech function and one of the other functions simultaneously.

This problem can be solved by that the user executes the phone call in a hands-free speech state. However, in order to execute the phone call simultaneously with browsing the information on the Internet, there has been only a method that the hands-free speech state is set manually.

There are following technologies that make the mobile communication terminal the hands-free speech state automatically. However, as mentioning below, the object is different from the present invention, and they are not suitable for executing the phone call and browsing information on the Internet simultaneously.

Japanese Patent Application Laid-Open No. 2001-197556 discloses "Controlling Apparatus for Mobile Communication Terminal, Hands-Free Type Car Telephone and Controlling Method thereof, Mobile Communication Terminal and Controlling Method thereof, Mobile Communication System and Network System for Mobile Communication Service ". In this patent application, a hands-free type car telephone is provided in a car, in addition to a mobile communication terminal, and when the engine of the car was started up, the operation is switched over to the hands-free type car telephone from the mobile communication terminal. In case that a phone call was received at the mobile communication terminal, the hands-free type car telephone starts to work. With this switching over operation, the user can talk in the hands-free speech state. That is, by switching over from the mobile communication terminal to the hands-free type car telephone automatically, the use of the mobile communication terminal is surely prevented during his/her driving.

Japanese Patent Application Laid-Open No. HEI 9-187060 discloses "Mobile Communication Terminal Having Wireless Earphone". In this patent application, a mobile communication terminal and an audio reproducing instrument are unified, and further an earphone-microphone section is provided. And the unified unit and the earphone-microphone section is connected with radio communication. And in case that a ringing tone was generated during music reproduction, a controlling section stops reproducing music, and the earphone-microphone section outputs the ringing tone, and further, the music reproducing mode is switched over to the speech mode automatically. With this switching over operation, even during the music reproduction, receiving a phone call is surely recognized, and the user can talk on the mobile communication terminal.

Japanese Patent Application Laid-Open No. 2002-33797 discloses "Switching Over Apparatus Between Hands-free Mobile Communication Terminal and Audio Equipment". In this patent application, a common earphone for a mobile communication terminal and audio equipment is provided. And when the mobile communication terminal became a speech state while the user was listening to music, the audio signal inputting to the common earphone becomes the audio signal from the mobile communication terminal by the switching over operation. And when the speech state finished, the audio signal inputting to the common earphone becomes the audio signal from the audio equipment again. Therefore, even if the audio equipment is reproducing music, when the mobile communication terminal received a phone call, the user can talk at the mobile communication terminal by this switching over operation.

However, at the conventional technologies mentioned above, one of the objects is to keep the safety while the user is driving a car, even when the user uses the speech function. And the other of the objects is to make talking on the mobile communication terminal possible at the time when a telephone call is received while the user is listening to music. However, they do not teach that the user simultaneously operates the speech function and one of the other functions, such as a browsing information function on the Internet, an e-mail transmitting or receiving function. Further, in case that these conventional technologies are applied to operate browsing information on the Internet, the user must operate the car telephone or the mobile communication terminal by interrupting his/her talk. Even if the user can operate the mobile communication terminal by using the earphone-microphone, when he/she lost the earphone-microphone, the hands-free function is also lost. Further, using the earphone-microphone is bothersome for the user, because that the cable of the earphone-microphone is occasionally caught by something.

SUMMARY OF THE INVENTION

It is therefore an object of the present invention to provide a mobile communication terminal having a hands-free speech state and a computer program for switching over to the hands-free speech state at the mobile communication terminal, in which a speech function and one of the other functions, such as a browsing information function on the Internet and an e-mail transmitting or receiving function, can be operated simultaneously, by not interrupting the speech function and by not using an earphone-microphone.

According to a first aspect of the present invention, for achieving the object mentioned above, there is provided a mobile communication terminal having a hands-free speech state. The mobile communication terminal having the hands-free speech state provides a displaying section. And in case that one of the functions except a speech function is used during a speech state, the speech state is automatically switched over to a hands-free speech state, and the one of the functions is executed by that a user watches the displaying section with the speech function simultaneously.

According to a second aspect of the present invention, in the first aspect, the mobile communication terminal having the hands-free speech state further provides a controlling section that controls each section in the mobile communication terminal having the hands-free speech state, a memory that stores data and a computer program, an operating section that the user executes a key input, a speaker that outputs sound, a microphone to which the user inputs his/her voice, an audio processing section that processes audio signals, a base-band processing section that processes various signals, a modem that modulates transmitting signals and demodulates received signals, a radio section that controls transmitting radio signals and received radio signals, and an antenna that transmits radio signals and receives radio signals. And in case that the one of the functions except the speech function is used during the speech state, the speech state is automatically switched over to the hands-free speech state, by the operation of the controlling section, and the one of the functions is executed by that the user watches the displaying section with the speech function simultaneously.

According to a third aspect of the present invention, in the first aspect, the functions except the speech function are functions that the user operates by watching the displaying section.

According to a fourth aspect of the present invention, in the third aspect, one of the functions except the speech function is a function that browses information on the Internet.

According to a fifth aspect of the present invention, in the third aspect, one of the functions except the speech function is a function that transmits an e-mail or receives an e-mail.

According to a sixth aspect of the present invention, in the third aspect, one of the functions except the speech function is one of application functions that include an e-mail writing and storing function, a calendar displaying function, a time displaying function, a scheduling function, a game function, a telephone directory editing and referring function, a moving picture reproducing function, and various user setting functions.

According to a seventh aspect of the present invention, in the second aspect, the controlling section confirms a key input during the speech state, and further confirms whether the key input was to start up browsing information on the Internet, transmitting or receiving an e-mail, or one of the application functions, and the controlling section switches over to the hands-free speech state from the speech state, based on the confirmed result.

According to an eighth aspect of the present invention, in the second aspect, the controlling section confirms a key input during the speech state, and also confirms whether the condition for switching over to the hands-free speech state automatically has been set or not, and further the controlling section confirms whether the key input was to start up browsing information on the Internet, transmitting or receiving an e-mail, or one of the application functions, and the controlling section switches over to the hands-free speech state from the speech state, based on the confirmed results.

According to a ninth aspect of the present invention, in the second aspect, the hands-free speech state is made by that the volume of the speaker is set to be larger than that at the normal speech state and the sensitivity of the microphone is set to be higher than that at the normal speech state.

According to a tenth aspect of the present invention, there is provided a computer program for switching over to a hands-free speech state at mobile communication terminal having a hands-free speech state, which provides a controlling section that controls each section in the mobile communication terminal having the hands-free speech state, a displaying section that displays information, a memory that stores data and a computer program, an operating section that a user executes a key input, a speaker that outputs sound, a microphone to which the user inputs his/her voice, an audio processing section that processes audio signals, a base-band processing section that processes various signals, a modem that modulates transmitting signals and demodulates received signals, a radio section that controls transmitting radio signals and received radio signals, and an antenna that transmits radio signals and receives radio signals. And, in case that one of the functions except a speech function is used during a speech state, the computer program storing in the memory makes the controlling section work as a switching over means that switches over from the speech state to the hands-free speech state, and the one of the functions is executed with the speech function simultaneously.

According to an eleventh aspect of the present invention, in the tenth aspect, the computer program for switching over to the hands-free speech state provides the steps of; confirming a key input for executing the one of the functions except the speech function during the speech state, confirming whether the key input was to start up browsing information on the Internet or not, when the key input existed, executing switching over operation to the hands-free speech state from the speech state, when the key input was to start up browsing information on the Internet, confirming whether the key input was to start up transmitting an e-mail or receiving an e-mail, when the key input was not to start up browsing information on the Internet, executing switching over operation to the hands-free speech state from the speech state, when the key input was to start up transmitting an e-mail or receiving an e-mail, confirming whether the key input was to start up one of the application functions, when the key input was not to start up transmitting an e-mail or receiving an e-mail, and executing switching over operation to the hands-free speech state from the speech state, when the key input was to start up the one of the application functions.

According to a twelfth aspect of the present invention, in the tenth aspect, the computer program for switching over to the hands-free speech state provides the steps of, confirming a key input for executing the one of the functions except the speech function during the speech state, confirming whether the condition for switching over to the hands-free speech state automatically has been set or not, when the key input existed, confirming whether the key input was to start up browsing information on the Internet or not, when the condition for switching over to the hands-free speech state automatically has been set, executing switching over operation to the hands-free speech state from the speech state, when the key input was to start up browsing information on the Internet, confirming whether the key input was to start up transmitting an e-mail or receiving an e-mail, when the key input was not to start up browsing information on the Internet, executing switching over operation to the hands-free speech state from the speech state, when the key input was to start up transmitting an e-mail or receiving an e-mail, confirming whether the key input was to start up one of the application functions, when the key input was not to start up transmitting an e-mail or receiving an e-mail, and executing switching over operation to the hands-free speech state from the speech state, when the key input was to start up the one of the application functions. And in case that the condition for switching over to the hands-free speech state automatically has not been set, when the key input existed, the computer program for switching over to the hands-free speech state further provides the step of; executing the function instructed by the key input by not switching over to the hands-free speech state from the speech state with the speech function simultaneously.

According to a thirteenth aspect of the present invention, in the tenth aspect, the computer program makes the controlling section also work as a controlling means that makes the volume of the speaker larger than that at the normal speech state and makes the sensitivity of the microphone higher than that at the normal speech state, when the switching over means judged that the hands-free speech state was executed.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, embodiments of the present invention are explained in detail.

Figure 1:
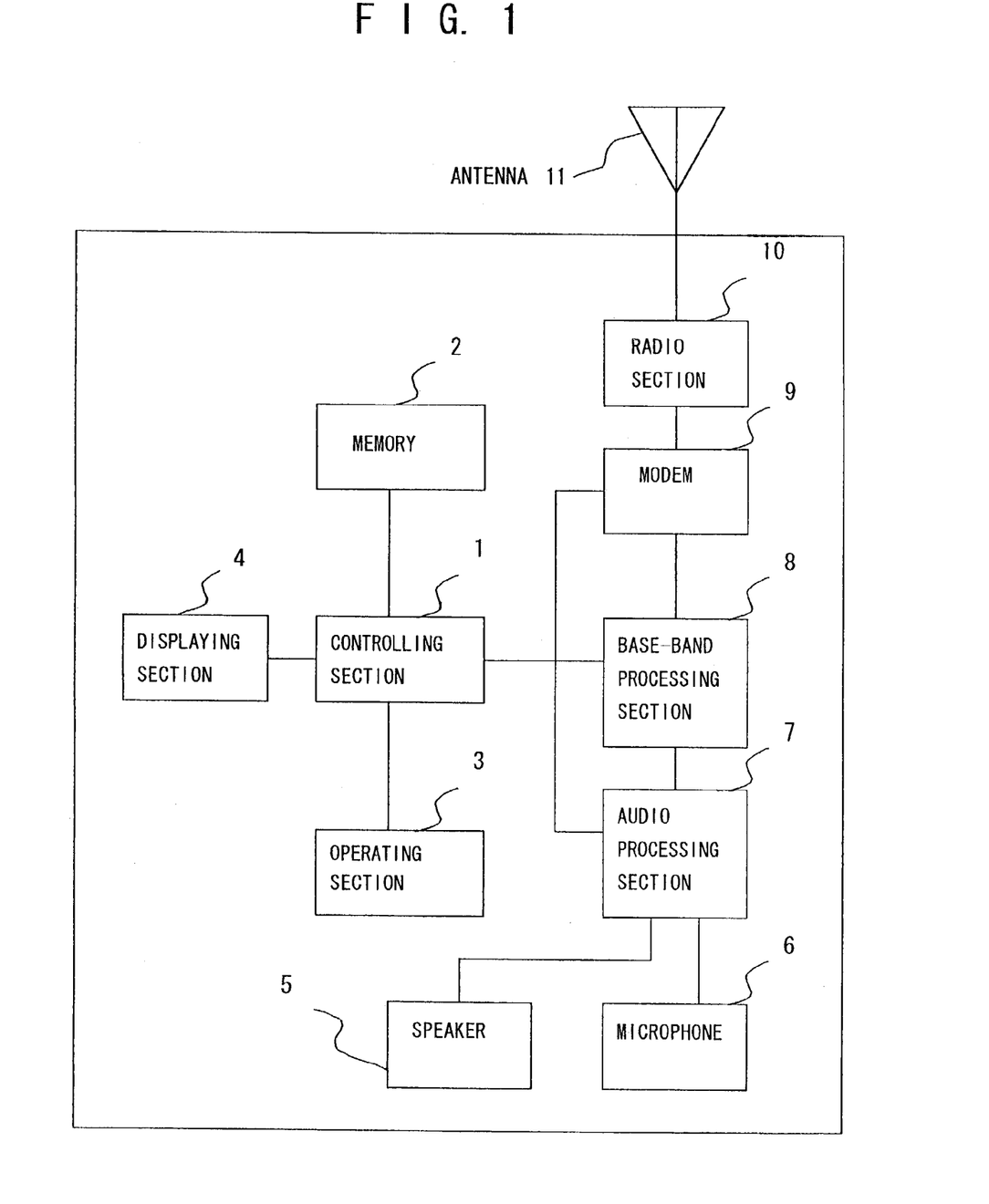
FIG. 1 is a block diagram showing a structure of a mobile communication terminal having a hands-free speech state at embodiments of the present invention.

FIG. 1 is a block diagram showing a structure of a mobile communication terminal having a hands-free speech state at the embodiments of the present invention. As shown in FIG. 1, the mobile communication terminal having the hands-free speech state at the embodiments of the present invention consists of a controlling section 1, a memory 2, an operating section 3, a displaying section 4, a speaker 5, a microphone 6, an audio processing section 7, a base-band processing section 8, a modem (modulator-demodulator) 9, a radio section 10, and an antenna 11.

The controlling section 1 controls each section in the mobile communication terminal having the hands-free speech state and works by a computer program control. The memory 2 stores data, such as telephone numbers, names of the telephone numbers, program data such as browser and mail software, and the computer program. The operating section 3 consists of digit keys, an on-hook key, an off-hook key, and other keys for scrolling a screen on the displaying section 4 and for selecting one of the other application functions. And by using the operating section 3, the user of the mobile communication terminal having the hands-free speech state starts up a phone call, an e-mail function, a browsing information function on the Internet, and one of the other application functions. On the displaying section 4, current operation inputted from the operating section 3, such as the phone call, the e-mail, and the browsing information on the Internet, is displayed. From the speaker 5, received phone call is outputted. By using the microphone 6, the voice of the user is inputted. The audio processing section 7 generates a ringing tone when a phone call is received and processes the received voice and the transmitting voice. The base-band processing section 8 processes various signals in the mobile communication terminal having the hands-free speech state. The modem 9 modulates transmitting signals and demodulates received signals. The radio section 10 controls received and transmitting radio signals. The antenna 11 receives and transmits radio signals.

Next, the operation of each section in the mobile communication terminal having the hands-free speech state of the present invention is explained. At the explanation of the embodiments of the present invention, in order to make the explanation concise, hereinafter, the mobile communication terminal having the hands-free speech state of the present invention is referred to as the mobile communication terminal except in some cases.

First, the operation that the mobile communication terminal becomes a speech state is explained. At the time when the user makes a phone call, the user inputs a destination telephone number at the operating section 3. After this, when the user started to call by using the operating section 3, the controlling section 1 instructs the base-band processing section 8 to establish communication with a base station. The base-band processing section 8 instructs the modem 9 to execute the modulation of transmitting signals and the demodulation of received signals. The modem 9 instructs the radio section 10 and the antenna 11 to communicate with the base station. When the radio communication was established, a signal signifying the establishment of the radio communication is sent from the base-band processing section 8 to the controlling section 1. The controlling section 1 recognizes that the radio communication was established. After the radio communication was established, the controlling section 1 instructs the audio processing section 7 to set a speech path, and also to set the volume of the speaker 5 and the sensitivity of the microphone 6. The audio processing section 7 makes the speaker 5 and the microphone 6 a usable state. With the operation mentioned above, the speech state was established.

In this, the speech state is a state that the user can hear the received voice from the destination telephone through the speaker 5 and also the user can transmit his/her voice to the destination telephone through the microphone 6, by placing the mobile communication terminal close to the ear of the user. And the hands-free speech state is a state that the user can operate the speech function by moving his/her ear from the mobile communication terminal.

Next, the operation that the user browses information on the Internet while the user keeps the speech state by a multi-task is explained. In this, the multi-task signifies a function that the user can execute one of the functions such as a browsing information function on the Internet, and an e-mail transmitting or receiving function at the same time while the user keeps the speech state at the same mobile communication terminal. This multi-task is a function that can operate plural functions simultaneously as the same as at the recent personal computer (PC). The combination of the functions that are operated simultaneously can be selected freely.

In case that the mobile communication terminal, which is in the speech state by the operation mentioned above, browses information on the Internet, the mobile communication terminal executes operation to transmit signals to a server on the Internet by that the user pushes keys for connecting to the Internet at the operating section 3. The controlling section 1 recognizes that the operation browsing information on the Internet was executed during the speech state, by confirming the key input at the operating section 3.

After this, the controlling section 1 instructs the audio processing section 7 to make the volume of the speaker 5 larger than that at the normal state. Further, the controlling section 1 instructs the audio processing section 7 to make the sensitivity of the microphone 6 higher than that at the normal state. With this higher sensitivity, the microphone 6 can catch a voice from a place being a few meters far from the mobile communication terminal. That is, at the present invention, in case that the user simultaneously uses one of the other functions during the speech state, the mobile communication terminal becomes the hands-free speech state, by changing the volume of the speaker 5 and the sensitivity of the microphone 6 automatically.

After this, the controlling section 1 instructs the base-band processing section 8 to establish communication with a base station so that the mobile communication terminal can browse information on the Internet. The base-band processing section 8 instructs the modem 9 to execute the modulation of the transmitting signals and the demodulation of the received signals. The modem 9 instructs the radio section 10 and the antenna 11 to communicate with the base station. When the radio communication was established, a signal signifying the establishment of the radio communication is sent from the base-band processing section 8 to the controlling section 1. The controlling section 1 recognizes that the radio communication was established. After the radio communication was established, the controlling section 1 instructs the displaying section 4 to display the information (data) received from the server on the Internet.

By the operation mentioned above, the user can browse information on the Internet while the user is continuing his/her speech in the hands-free speech state of the mobile communication terminal, without interrupting the speech. In this, the user can also execute one of the other functions such as the e-mail transmitting or receiving function by keeping the hands-free speech state at the mobile communication terminal.

Figure 2:
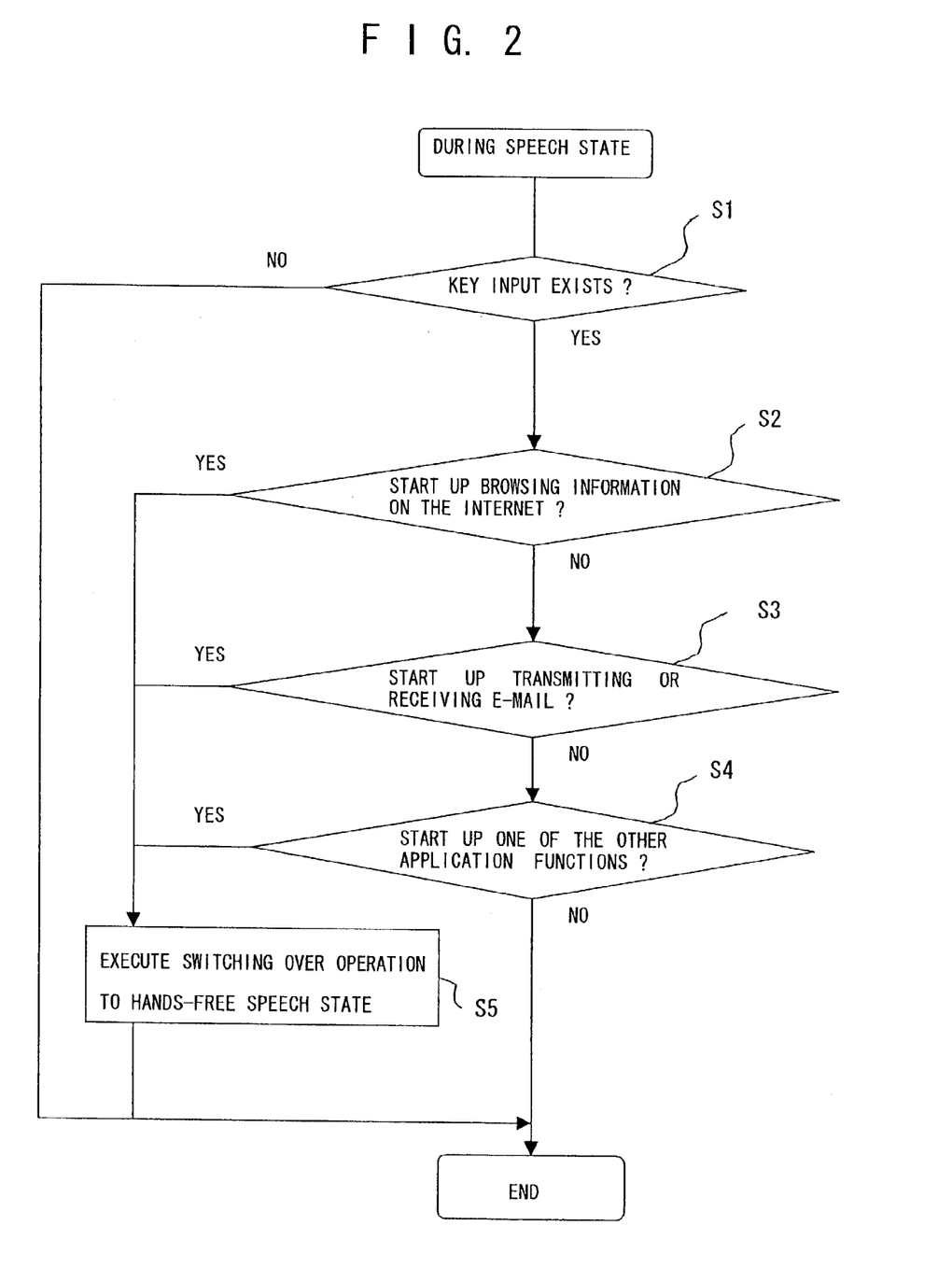
FIG. 2 is a flowchart showing the switching over operation to the hands-free speech state at a first embodiment of the present invention.

Next, referring to FIGS. 1 and 2, the switching over operation to the hands-free speech state at a first embodiment of the present invention is explained in detail. FIG. 2 is a flowchart showing the switching over operation to the hands-free speech state at the first embodiment of the present invention. In this explanation, as the step number, the step number showing in FIG. 2 is used.

A case, in which a user browses information on the Internet by its multi-task during the speech state of the mobile communication terminal, is explained.

First, the user executes a key input to transmit signals to a server on the Internet by pushing the keys at the operating section 3 for connecting to the Internet during the speech state. The controlling section 1 recognizes the key input (step S1). When the controlling section 1 recognized the key input (YES at the step S1), the controlling section 1 confirms whether the key input was to connect to the Internet for browsing information or not (step S2). That is, it is confirmed whether the key input was to start up the browsing information on the Internet or not at the step S2. In case that the key input was to connect to the Internet (YES at the step S2), the controlling section 1 executes the switching over operation to the hands-free speech state (step S5).

In this, at the switching over operation to the hands-free speech state, the controlling section 1 makes the speaker 5 output a speech having a larger volume than that at the normal state by instructing the audio processing section 7 to set the volume of the speaker 5. Further, at the switching over operation to the hands-free speech state, the controlling section 1 makes the microphone 6 higher sensitivity than that at the normal state by instructing the audio processing section 7 to set the sensitivity of the microphone 6. With this operation, even when the user moves the mobile communication terminal from the ear of the user, the user can hear the speech from the destination telephone through the speaker 5 whose volume became larger, and also the user can transmit his/her voice to the destination telephone by the microphone 5 whose sensitivity became higher, while browsing information on the Internet.

At the embodiments of the present invention, the setting of the volume of the speaker 5 and the setting of the sensitivity of the microphone 6 are changed automatically, with this, the speech under the hands-free speech state can be executed. That is, the speech is executed in the hands-free speech state, therefore, the browsing information on the Internet can be executed simultaneously with the speech.

After this, the controlling section 1 instructs the base-band processing section 8 to establish the communication with the base station for executing the radio communication with the server on the Internet, for browsing information on the server. The base-band processing section 8 instructs the modem 9 to execute the modulation of the transmitting signals and the demodulation of the received signals. The modem 9 instructs the radio section 10 and the antenna 11 to communicate with the base station. When the radio communication was established, the base-band processing section 8 sends a signal signifying the establishment of the radio communication to the controlling section 1. The controlling section 1 recognizes the establishment of the radio communication. After the radio communication was established, the controlling section 1 makes the displaying section 4 display the information (data) received from the server on the Internet.

Next, a case, in which a user transmits an e-mail to a destination telephone by its multi-task during the speech state of the mobile communication terminal, is explained.

First, the user executes a key input to transmit signals to a mail server by pushing keys at the operating section 3 for transmitting the e-mail to the mail server during the speech state. The controlling section 1 recognizes the key input (step S1). When the controlling section 1 recognized the key input (YES at the step S1), the controlling section 1 confirms whether the key input was to connect to the Internet for browsing information or not (step S2). That is, it is confirmed whether the key input was to start up the browsing information on the Internet or not at the step S2. In case that the key input was not to connect to the Internet (NO at the step S2), the controlling section 1 confirms whether the key input was to connect to the mail server or not (step S3). That is, it is confirmed whether the key input was to start up the transmitting or receiving an e-mail or not at the step S3. In case that the key input was to connect to the mail server (YES at the step S3), the controlling section 1 executes the switching over operation to the hands-free speech state (step S5). With this switching over operation to the hands-free speech state, even when the user moves the mobile communication terminal from the ear of the user, the user can hear the speech from the destination telephone through the speaker 5 whose volume became larger, and also the user can transmit his/her voice to the destination telephone by the microphone 5 whose sensitivity became higher, while transmitting the e-mail.

After this, the controlling section 1 instructs the base-band processing section 8 to establish the communication with the base station for executing the radio communication with the mail server, for transmitting the e-mail. The base-band processing section 8 instructs the modem 9 to execute the modulation of the transmitting signals. The modem 9 instructs the radio section 10 and the antenna 11 to communicate with the base station. When the radio communication was established, the base-band processing section 8 sends a signal signifying the establishment of the radio communication to the controlling section 1. The controlling section 1 recognizes the establishment of the radio communication. After the radio communication was established, the controlling section 1 transmits mail data storing in the memory 2 to the mail server, via the base-band processing section 8, the modem 9, the radio section 10, and the antenna 11. With this operation mentioned above, the e-mail transmission was completed during the hands-free speech state.

Next, a case, in which a user receives an e-mail from a source telephone by its multi-task during the speech state of the mobile communication terminal, is explained.

First, the user executes a key input to receive signals from a mail server by pushing the keys at the operating section 3 for receiving the e-mail from the mail server during the speech state. The controlling section 1 recognizes the key input (step S1). When the controlling section 1 recognized the key input (YES at the step S1), the controlling section 1 confirms whether the key input was to connect to the Internet for browsing information or not (step S2). That is, it is confirmed whether the key input was to start up the browsing information on the Internet or not at the step S2. In case that the key input was not to connect to the Internet (NO at the step S2), the controlling section 1 confirms whether the key input was to connect to the mail server or not (step S3). That is, it is confirmed whether the key input was to start up the transmitting or receiving an e-mail or not at the step S3. In case that the key input was to connect to the mail server (YES at the step S3), the controlling section 1 executes the switching over operation to the hands-free speech state (step S5). With this switching over operation to the hands-free speech state, even when the user moves the mobile communication terminal from the ear of the user, the user can hear the speech from the destination telephone through the speaker 5 whose volume became larger, and also the user can transmit his/her voice to the destination telephone by the microphone 5 whose sensitivity became higher, while receiving the e-mail.

After this, the controlling section 1 instructs the base-band processing section 8 to establish the communication with the base station for executing the radio communication with the mail server, for receiving the e-mail. The base-band processing section 8 instructs the modem 9 to execute the demodulation of the received signals. The modem 9 instructs the radio section 10 and the antenna 11 to communicate with the base station. When the radio communication was established, the base-band processing section 8 sends a signal signifying the establishment of the radio communication to the controlling section 1. The controlling section 1 recognizes the establishment of the radio communication. After the radio communication was established, the controlling section 1 transmits an e-mail receiving signal to the mail server, via the base-band processing section 8, the modem 9, the radio section 10, and the antenna 11. The e-mail received from the mail server is recognized by the controlling section 1 via the antenna 11, the radio section 10, the modem 9, and the base-band processing section 8. The received e-mail is stored in the memory 2 and also is displayed on the displaying section 4, by the instruction from the controlling section 1. With this operation mentioned above, the e-mail reception was completed during the hands-free speech state.

Next, a case, in which a user executes one of the other application functions by its multi-task during the speech state of the mobile communication terminal, is explained.

First, the user executes a key input to use one of the other application functions by pushing the keys at the operating section 3 during the speech state. The controlling section 1 recognizes the key input (step S1). When the controlling section 1 recognized the key input (YES at the step S1), the controlling section 1 confirms whether the key input was to connect to the Internet for browsing information or not (step S2). That is, it is confirmed whether the key input was to start up the browsing information on the Internet or not at the step S2. In case that the key input was not to connect to the Internet (NO at the step S2), the controlling section 1 confirms whether the key input was to connect to a mail server or not (step S3). That is, it is confirmed whether the key input was to start up the transmitting or receiving an e-mail or not at the step S3. In case that the key input was not to connect to the mail server (NO at the step S3), the controlling section 1 confirms whether the key input was to start up one of the other application functions or not (step S4). In case that the key input was to start up one of the other application functions (YES at the step S4), the controlling section 1 executes the switching over operation to the hands-free speech state (step S5). With this switching over operation to the hands-free speech state, even when the user moves the mobile communication terminal from the ear of the user, the user can hear the speech from the destination telephone through the speaker 5 whose output volume became larger, and also the user can transmit his/her voice to the destination telephone by the microphone 5 whose sensitivity became higher, while executing one of the other application functions.

After this, the controlling section 1 executes one of the other application functions, designated by the user, by reading out it from the memory 2. In this, the other application functions signify various functions that can be realized by the mobile communication terminal, such as an e-mail writing and storing function, a calendar displaying function, a time displaying function, a scheduling function, a game function, a telephone directory editing and referring function, a moving picture reproducing function, and various user setting functions.

As mentioned above, according to the first embodiment of the present invention, when the user started up one of the other functions (browsing information on the Internet, transmitting or receiving an e-mail, executing one of the other application functions) by the multi-task during the speech state of the mobile communication terminal, the speech state is switched over from the current speech state to the hands-free speech state. Therefore, one of the other functions can be used without interrupting the speech function.

Figure 3:
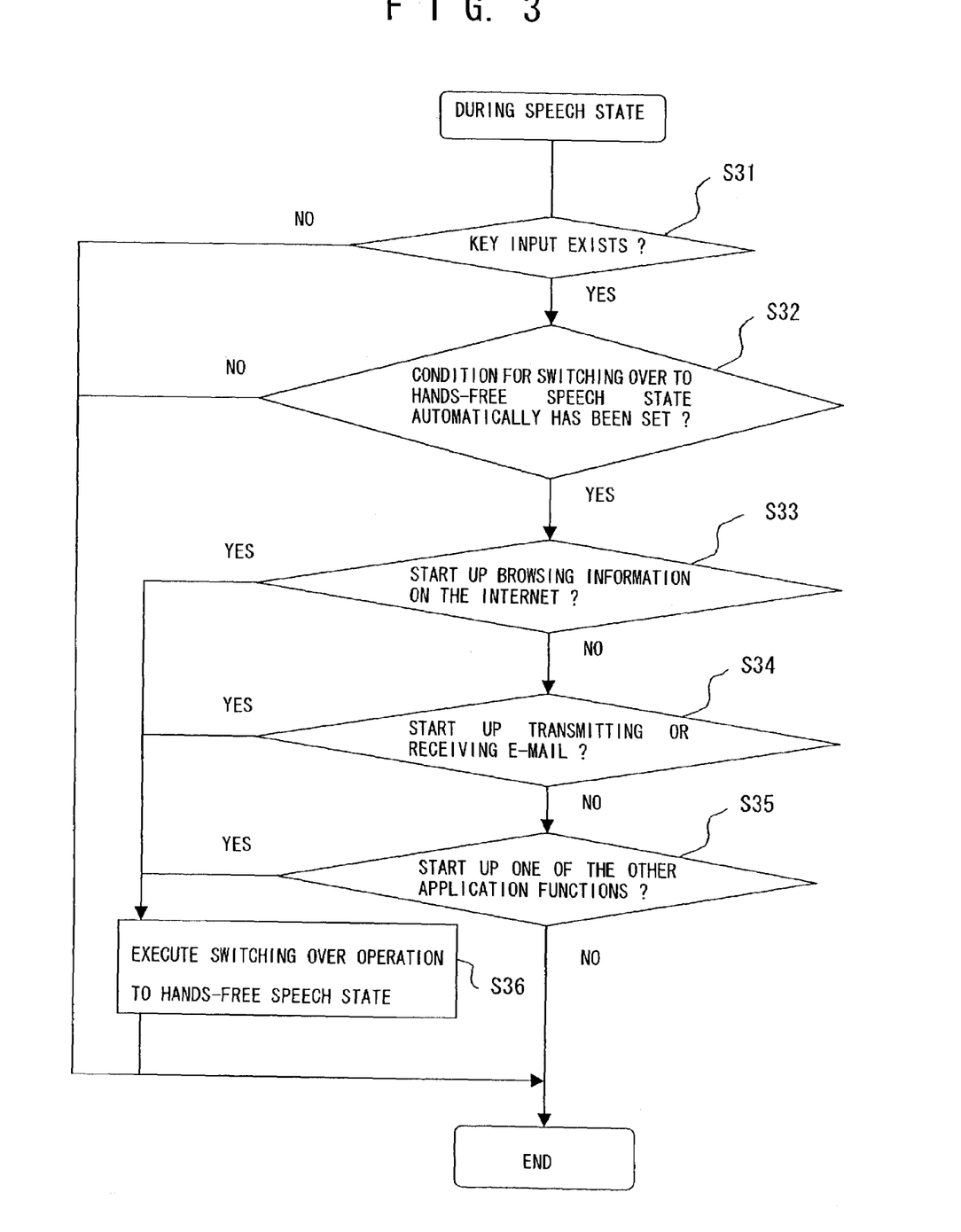
FIG. 3 is a flowchart showing the switching over operation to the hands-free speech state at a second embodiment of the present invention.

Next, referring to the drawings, a second embodiment of the present invention is explained. At the first embodiment of the present invention, when the user started up one of the other functions (browsing information on the Internet, transmitting or receiving an e-mail, executing one of the other application functions) by the multi-task during the speech state of the mobile communication terminal, the speech state is automatically switched over from the current speech state to the hands-free speech state. However, at the second embodiment of the present invention, when the user started up one of the other functions by the multi-task during the speech state of the mobile communication terminal, the switching over to the hands-free speech state can be selected by the user, by setting the condition in the memory 2 beforehand. That is, the condition, which the switching over to the hands-free speech state from the current speech state is automatically executed, is stored in the memory 2 beforehand. And the user can select the condition.

FIG. 3 is a flowchart showing the switching over operation to the hands-free speech state at the second embodiment of the present invention. Referring to FIGS. 1 and 3, the second embodiment of the present invention is explained in detail. In this explanation, as the step number, the step number showing in FIG. 3 is used.

First, the condition, which the switching over to the hands-free speech state from the current speech state is automatically executed, is explained. This condition is stored in the memory 2. Before the user starts up one of the other functions (browsing information on the Internet, transmitting or receiving an e-mail, executing one of the other application functions) by the multi-task during the speech state of the mobile communication terminal, the user selects this condition. That is, the user can select the condition, which the switching over to the hands-free speech state from the current speech state is automatically executed.

In order to set this condition, the user executes a specified key input, with which the condition is set, at the operating section 3. The controlling section 1 stores the set condition in the memory 2 by recognizing the specified key input. When the user executes a designated key input at the operating section 3, the controlling section 1 starts up a program, which executes the switching over operation to the hands-free speech state automatically. And also the controlling section 1 makes the displaying section 4 display a screen, in which the condition for executing the switching over operation to the hands-free speech state is executed automatically is displayed. By watching the screen, the user selects whether the condition is executed or not, before the user starts up one of the other functions. The controlling section 1 recognizes the selected result, and stores the selected result in the memory 2.

A case, in which a user browses information on the Internet by its multi-task during the speech state of the mobile communication terminal, is explained.

First, the user executes a key input to transmit signals to a server on the Internet by pushing the keys at the operating section 3 for connecting to the Internet during the speech state. The controlling section 1 recognizes the key input (step S31). When the controlling section 1 recognized the key input (YES at the step S31), the controlling section 1 confirms whether the condition for switching over to the hands-free speech state automatically has been set in the memory 2 or not (step S32). In case that the condition for switching over to the hands-free speech state automatically has been set (YES at the step S32), the controlling section 1 confirms whether the key input was to connect to the Internet for browsing information or not (step S33). That is, it is confirmed whether the key input was to start up the browsing information on the Internet or not at the step S33. In case that the key input was to connect to the Internet (YES at the step S33), the controlling section 1 executes the switching over operation to the hands-free speech state (step S36). With this operation, even when the user moves the mobile communication terminal from the ear of the user, the user can hear the speech from the destination telephone through the speaker 5 whose volume became larger, and also the user can transmit his/her voice to the destination telephone by the microphone 5 whose sensitivity became higher, while browsing information on the Internet.

After this, the controlling section 1 instructs the base-band processing section 8 to establish the communication with the base station for executing the radio communication with the server on the Internet, for browsing information on the server. The base-band processing section 8 instructs the modem 9 to execute the modulation of the transmitting signals and the demodulation of the received signals. The modem 9 instructs the radio section 10 and the antenna 11 to communicate with the base station. When the radio communication was established, the base-band processing section 8 sends a signal signifying the establishment of the radio communication to the controlling section 1. The controlling section 1 recognizes the establishment of the radio communication. After the radio communication was established, the controlling section 1 makes the displaying section 4 display the information (data) received from the server on the Internet. In this, in case that the condition for switching over to the hands-free speech state automatically has not been set (NO at the step S32), the hands-free speech state is not executed. That is, the speech state is continued by not switching over to the hands-free speech state, and the operation for browsing information on the Internet is also executed simultaneously with the current speech state.

Next, a case, in which a user transmits an e-mail to a destination telephone by its multi-task during the speech state of the mobile communication terminal, is explained.

First, the user executes a key input to transmit signals to a mail server by pushing keys at the operating section 3 for transmitting the e-mail to the mail server during the speech state. The controlling section 1 recognizes the key input (step S31). When the controlling section 1 recognized the key input (YES at the step S31), the controlling section 1 confirms whether the condition for switching over to the hands-free speech state automatically has been set in the memory 2 or not (step S32). In case that the condition for switching over to the hands-free speech state automatically has been set (YES at the step S32), the controlling section 1 confirms whether the key input was to connect to the Internet for browsing information or not (step S33). That is, it is confirmed whether the key input was to start up the browsing information on the Internet or not at the step S33. In case that the key input was not to connect to the Internet (NO at the step S33), the controlling section 1 confirms whether the key input was to connect to the mail server or not (step S34). That is, it is confirmed whether the key input was to start up transmitting or receiving an e-mail to the mail sever or not at the step S34. In case that the key input was to connect to the mail server (YES at the step S34), the controlling section 1 executes the switching over operation to the hands-free speech state (step S36). With this switching over operation to the hands-free speech state, even when the user moves the mobile communication terminal from the ear of the user, the user can hear the speech from the destination telephone through the speaker 5 whose volume became larger, and also the user can transmit his/her voice to the destination telephone by the microphone 5 whose sensitivity became higher, while transmitting the e-mail.

After this, the controlling section 1 instructs the base-band processing section 8 to establish the communication with the base station for executing the radio communication with the mail server, for transmitting the e-mail. The base-band processing section 8 instructs the modem 9 to execute the modulation of the transmitting signals. The modem 9 instructs the radio section 10 and the antenna 11 to communicate with the base station. When the radio communication was established, the base-band processing section 8 sends a signal signifying the establishment of the radio communication to the controlling section 1. The controlling section 1 recognizes the establishment of the radio communication. After the radio communication was established, the controlling section 1 transmits mail data storing in the memory 2 to the mail server, via the base-band processing section 8, the modem 9, the radio section 10, and the antenna 11. With this operation mentioned above, the e-mail transmission was completed during the hands-free speech state. In this, in case that the condition for switching over to the hands-free speech state automatically has not been set (NO at the step S32), the hands-free speech state is not executed. That is, the speech state is continued by not switching over to the hands-free speech state, and the operation for transmitting the e-mail to the mail sever is also executed simultaneously with the current speech state.

Next, a case, in which a user receives an e-mail from a source telephone by its multi-task during the speech state of the mobile communication terminal, is explained.

First, the user executes a key input to receive signals from a mail server by pushing the keys at the operating section 3 for receiving the e-mail from the mail server during the speech state. The controlling section 1 recognizes the key input (step S31). When the controlling section 1 recognized the key input (YES at the step S31), the controlling section 1 confirms whether the condition for switching over to the hands-free speech state automatically has been set in the memory 2 or not (step S32). In case that the condition for switching over to the hands-free speech state automatically has been set (YES at the step S32), the controlling section 1 confirms whether the key input was to connect to the Internet for browsing information or not (step S33). That is, it is confirmed whether the key input was to start up the browsing information on the Internet or not at the step S33. In case that the key input was not to connect to the Internet (NO at the step S33), the controlling section 1 confirms whether the key input was to connect to the mail server or not (step S34). That is, it is confirmed whether the key input was to start up transmitting or receiving an e-mail to the mail sever or not at the step S34. In case that the key input was to connect to the mail server (YES at the step S34), the controlling section 1 executes the switching over operation to the hands-free speech state (step S36). With this switching over operation to the hands-free speech state, even when the user moves the mobile communication terminal from the ear of the user, the user can hear the speech from the destination telephone through the speaker 5 whose volume became larger, and also the user can transmit his/her voice to the destination telephone by the microphone 5 whose sensitivity became higher, while receiving the e-mail.

After this, the controlling section 1 instructs the base-band processing section 8 to establish the communication with the base station for executing the radio communication with the mail server, for receiving the e-mail. The base-band processing section 8 instructs the modem 9 to execute the demodulation of the received signals. The modem 9 instructs the radio section 10 and the antenna 11 to communicate with the base station. When the radio communication was established, the base-band processing section 8 sends a signal signifying the establishment of the radio communication to the controlling section 1. The controlling section 1 recognizes the establishment of the radio communication. After the radio communication was established, the controlling section 1 transmits an e-mail receiving signal to the mail server, via the base-band processing section 8, the modem 9, the radio section 10, and the antenna 11. The e-mail received from the mail server is recognized by the controlling section 1 via the antenna 11, the radio section 10, the modem 9, and the base-band processing section 8. The received e-mail is stored in the memory 2 and also is displayed on the displaying section 4, by the instruction from the controlling section 1. With this operation mentioned above, the e-mail reception was completed during the hands-free speech state. In this, in case that the condition for switching over to the hands-free speech state automatically has not been set (NO at the step S32), the hands-free speech state is not executed. That is, the speech state is continued by not switching over to the hands-free speech state, and the operation for receiving the e-mail from the mail sever is also executed simultaneously with the current speech state.

Next, a case, in which a user executes one of the other application functions by its multi-task during the speech state of the mobile communication terminal, is explained.

First, the user executes a key input to use one of the other application functions by pushing the keys at the operating section 3 during the speech state. The controlling section 1 recognizes the key input (step S31). When the controlling section 1 recognized the key input (YES at the step S31), the controlling section 1 confirms whether the condition for switching over to the hands-free speech state automatically has been set in the memory 2 or not (step S32). In case that the condition for switching over to the hands-free speech state automatically has been set (YES at the step S32), the controlling section 1 confirms whether the key input was to connect to the Internet for browsing information or not (step S33). That is, it is confirmed whether the key input was to start up the browsing information on the Internet or not at the step S33. In case that the key input was not to connect to the Internet (NO at the step S33), the controlling section 1 confirms whether the key input was to connect to a mail server or not (step S34). That is, it is confirmed whether the key input was to start up transmitting or receiving an e-mail to the mail sever or not at the step S34. In case that the key input was not to connect to the mail server (NO at the step S34), the controlling section 1 confirms whether the key input was to start up one of the other application functions or not (step S35). In case that the key input was to start up one of the other application functions (YES at the step S35), the controlling section 1 executes the switching over operation to the hands-free speech state (step S36). With this switching over operation to the hands-free speech state, even when the user moves the mobile communication terminal from the ear of the user, the user can hear the speech from the destination telephone through the speaker 5 whose output volume became larger, and also the user can transmit his/her voice to the destination telephone by the microphone 5 whose sensitivity became higher, while executing one of the other application functions.

After this, the controlling section 1 executes one of the other application functions, designated by the user, by reading out it from the memory 2, during the hands-free speech state.

In this, the other application functions are various functions that can be realized by the mobile communication terminal, such as an e-mail writing and storing function, a calendar displaying function, a time displaying function, a scheduling function, a game function, a telephone directory editing and referring function, a moving picture reproducing function, and various user setting functions. In this, in case that the condition for switching over to the hands-free speech state automatically has not been set (NO at the step S32), the hands-free speech state is not executed. That is, the speech state is continued by not switching over to the hands-free speech state, and the operation for executing one of the other application functions is also carried out simultaneously with the current speech state.

As mentioned above, according to the second embodiment of the present invention, when the user started up one of the other functions (browsing information on the Internet, transmitting or receiving an e-mail, executing one of the other application functions) by the multi-task during the speech state of the mobile communication terminal, the speech state is switched over from the current speech state to the hands-free speech state, under the condition, which the switching over to the hands-free speech state from the current speech state is automatically executed, set by the user. And this condition can be selected by the user, therefore, the user can decide whether the switching over to the hands-free speech state is executed or not.

As mentioned above, at the embodiments of the present invention, the switching over operation to the hands-free speech state from the current speech state is executed by a computer program storing in the memory 2. That is, the computer program confirms whether the additional operation is browsing information on the Internet, transmitting or receiving an e-mail, or executing one of the other application functions by the instruction from the controlling section 1. Further, the computer program confirms that the condition, whether the switching over to the hands-free speech state from the current speech state is executed or not, has been stored in the memory 2, by the instruction from the controlling section 1. Therefore, the controlling section 1 operates the computer program by using the storing data in the memory 2.

As mentioned above, according to the embodiments of the mobile communication terminal having the hands-free speech state and the computer program for switching over to the hands-free speech state of present invention, the user can simultaneously use one of the functions such as a browsing information function on the Internet, an e-mail transmitting or receiving function, and one of the other application functions, while the user is talking at the mobile communication terminal. In this case, the user can talk with the destination telephone in the hands-free speech state by switching over automatically from the speech state. Therefore, the user can easily and conveniently use one of the other functions at the mobile communication terminal simultaneously with the speech function, without interrupting the speech function.

Moreover, according to the present invention, the mobile communication terminal automatically becomes the hands-free speech state, consequently, an earphone-microphone does not need and the cable of the earphone-microphone does not bother the user. And the user can watch the screen on the display by moving his/her ear from the mobile communication terminal, therefore, the user can easily use one of the other functions with the speech function simultaneously.

Furthermore, the user can beforehand set the condition whether the mobile communication terminal is made to be in the hands-free speech state or not. Therefore, the user can select freely not to make the mobile communication terminal the hands-free speech state, corresponding to the situation, for example, the user does not want to make the other persons know the contents of the speech, or to generate noise to the other persons.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile communication terminal having a hands-free speech state, comprising:
   a displaying section, wherein:
   in case that a function other than a speech function is used during a speech state, said speech state is automatically switched over to a hands-free speech state, and said function is executed by said displaying section with said speech function simultaneously, and
   said function other than said speech function comprises one of a function that browses information on the Internet, a function that transmits an e-mail or receives an e-mail, and an application function.

2. A mobile communication terminal having a hands-free speech state in accordance with claim 1, further comprising:
   a controlling section that controls each section in said mobile communication terminal having said hands-free speech state;
   a memory that stores data and a computer program;
   an operating section that said user uses to execute a key input;
   a speaker that outputs sound;
   a microphone to which said user inputs his/her voice;
   an audio processing section that processes audio signals;
   a base-band processing section that processes signals;
   a modem that modulates transmitting signals and demodulates received signals;
   a radio section that controls transmitting radio signals and received radio signals; and
   an antenna that transmits radio signals and receives radio signals, wherein:
   in case that said function other than said speech function is used during said speech state, said speech state is automatically switched over to said hands-free speech state, by the operation of said controlling section, and said function is executed by that said user watches said displaying section with said speech function simultaneously.

3. A mobile communication terminal having a hands-free speech state in accordance with claim 1, wherein:
   said function other than said speech function comprises a function that said user operates by watching said displaying section.

4. A mobile communication terminal having a hands-free speech state in accordance with claim 3, wherein:
   said function other than said speech function comprises said function that browses information on the Internet.

5. A mobile communication terminal having a hands-free speech state in accordance with claim 3, wherein:
   said function other than said speech function comprises said function that transmits an e-mail or receives an e-mail.

6. A mobile communication terminal having a hands-free speech state in accordance with claim 3, wherein:
   said function other than said speech function comprises said application function, and
   said application function comprises one of an e-mail writing and storing function, a calendar displaying function, a time displaying function, a scheduling function, a game function, a telephone directory editing and referring function, a moving picture reproducing function, and a user setting function.

7. A mobile communication terminal having a hands-free speech state in accordance with claim 2, wherein:
said controlling section confirms a key input during said speech state, and further confirms whether said key input was to start up one of browsing information on the Internet, transmitting or receiving an e-mail, and said application function, and
said controlling section switches over to said hands-free speech state from said speech state, based on confirmed results.

8. A mobile communication terminal having a hands-free speech state in accordance with claim 2, wherein:
said controlling section confirms a key input during said speech state, and also confirms whether a condition for switching over to said hands-free speech state automatically has been set,
said controlling section confirms whether said key input was to start up one of browsing information on the Internet, transmitting or receiving an e-mail, and said application function, and
said controlling section switches over to said hands-free speech state from said speech state, based on confirmed results.

9. A mobile communication terminal having a hands-free speech state in accordance with claim 2, wherein:
in said hands-free speech state a volume of said speaker is set to be larger than that at the speech state and a sensitivity of said microphone is set to be higher than that at the speech state.

10. The mobile communication terminal of claim 1, wherein to move into said hands free speech state, a single action is employed comprising activating said other function.

11. The mobile communication terminal of claim 1, wherein said terminal comprises a single user interface on which keys are assigned to functions.

12. A computer program for switching over to a hands-free speech state stored in a memory of a mobile communication terminal having a hands-free speech state, said terminal comprising:
a controlling section that controls each section in said mobile communication terminal having said hands-free speech state,
a displaying section that displays information,
an operating section that a user uses to execute a key input,
a speaker that outputs sound,
a microphone to which said user inputs his/her voice,
an audio processing section that processes audio signals,
a base-band processing section that processes signals,
a modem that modulates transmitting signals and demodulates received signals,
a radio section that controls transmitting radio signals and received radio signals, and
an antenna that transmits radio signals and receives radio signals, wherein:
in case that a function other than a speech function is used during a speech state, said computer program stored in said memory makes said controlling section work as a switching over means that automatically switches over from said speech state to said hands-free speech state, and said function is executed with said speech function simultaneously, and
said function other than the speech function comprises one of browsing information on the Internet, transmitting an e-mail or receiving an e-mail, and an application function.

13. A computer program for switching over to a hands-free speech state in accordance with claim 12, said computer program being executed to perform a method comprising:
confirming a key input for executing said function other than said speech function during said speech state;
confirming whether said key input was to start up browsing information on the Internet, when said key input existed;
executing switching over operation to said hands-free speech state from said speech state, when said key input was to start up browsing information on the Internet;
confirming whether said key input was to start up transmitting an e-mail or receiving an e-mail, when said key input was not to start up browsing information on the Internet;
executing switching over operation to said hands-free speech state from said speech state, when said key input was to start up transmitting an e-mail or receiving an e-mail;
confirming whether said key input was to start up said application function, when said key input was not to start up transmitting an e-mail or receiving an e-mail; and
executing switching over operation to said hands-free speech state from said speech state, when said key input was to start up said application function.

14. A computer program for switching over to a hands-free speech state in accordance with claim 12, said computer program being executed to perform a method comprising:
confirming a key input for executing said function other than said speech function during said speech state;
confirming whether a condition for switching over to said hands-free speech state automatically has been set, when said key input existed;
confirming whether said key input was to start up browsing information on the Internet, when said condition for switching over to said hands-free speech state automatically has been set;
executing switching over operation to said hands-free speech state from said speech state, when said key input was to start up browsing information on the Internet;
confirming whether said key input was to start up transmitting an e-mail or receiving an e-mail, when said key input was not to start up browsing information on the Internet;
executing switching over operation to said hands-free speech state from said speech state, when said key input was to start up transmitting an e-mail or receiving an e-mail;
confirming whether said key input was to start up said application function, when said key input was not to start up transmitting an e-mail or receiving an e-mail; and
executing switching over operation to said hands-free speech state from said speech state, when said key input was to start up said application function, wherein:
in case that said condition for switching over to said hands-free speech state automatically has not been set, when said key input existed, said method further comprises:
executing the function instructed by said key input by not switching over to said hands-free speech state from said speech state with said speech function simultaneously.

15. A computer program for switching over to a hands-free speech state in accordance with claim 12, wherein:
said computer program makes said controlling section also work as a controlling means that makes a volume of said speaker larger than that at the speech state and makes a sensitivity of said microphone higher than that at the speech state, when said switching over means has judged that said hands-free speech state was executed.

16. The computer program of claim 12, wherein to move into said hands-free speech state, a single action is employed comprising activating said other function.

17. A mobile communication terminal having a hands-free speech state, comprising:
a displaying section; and
a controlling section for confirming that a function other than a speech function is used during a speech state and for switching over to said hands-free speech state from said speech state when said controlling section confirms that said function is being used during said speech state,
wherein said function comprises one of a function that browses information on the Internet, a function that transmits e-mail, a function that receives e-mail, and an application function.

18. A mobile communication terminal having a hands-free speech state in accordance with claim 17, wherein:
said function comprises said function that browses information on the Internet.

19. A mobile communication terminal having a hands-free speech state in accordance with claim 17, wherein:
said function comprises one of said function that transmits e-mail and said function that receives e-mail.

20. A mobile communication terminal having a hands-free speech state in accordance with claim 17, wherein:
said function comprises said application function, and
said application function comprises one of an e-mail writing and storing function, a calendar displaying function, a time displaying function, a scheduling function, a game function, a telephone directory editing and referring function, a moving picture reproducing function, and a user setting function.

21. A mobile communication terminal having a hands-free speech state in accordance with claim 17, further comprising:
a memory that stores data and a computer program;
an operating section that said user executes a key input;
a speaker that outputs sound;
a microphone to which said user inputs his/her voice;
an audio processing section that processes audio signals;
a base-band processing section that processes signals;
a modem that modulates transmitting signals and demodulates received signals;
a radio section that controls transmitting radio signals and received radio signals; and
an antenna that transmits radio signals and receives radio signals, wherein:
said controlling section confirms a key input during said speech state, and further confirms whether said key input was to start up said function, and
said controlling section switches over to said hands-free speech state from said speech state, based on confirmed results.

22. A mobile communication terminal having a hands-free speech state in accordance with claim 21, wherein:
said controlling section further confirms whether a condition for switching over to said hands-free speech state automatically has been set, and
said controlling section automatically switches over to said hands-free speech state from said speech state when said condition for switching is confirmed.

23. The mobile communication terminal of claim 17, wherein to move into said hands-free speech state, a single action is employed comprising activating said other function.

24. The mobile communication terminal of claim 17, wherein said terminal comprises a single user interface on which keys are assigned to functions.

* * * * *